US012056216B2

(12) United States Patent
Sawada et al.

(10) Patent No.: US 12,056,216 B2
(45) Date of Patent: Aug. 6, 2024

(54) IMAGE PROCESSING METHOD

(71) Applicant: NEC Corporation, Tokyo (JP)

(72) Inventors: Azusa Sawada, Tokyo (JP); Takashi Shibata, Tokyo (JP); Kazuto Takizawa, Tokyo (JP)

(73) Assignee: NEC CORPORATION, Tokyo (JP)

(*) Notice: Subject to any disclaimer, the term of this patent is extended or adjusted under 35 U.S.C. 154(b) by 55 days.

(21) Appl. No.: 17/801,849

(22) PCT Filed: Mar. 19, 2020

(86) PCT No.: PCT/JP2020/012305
§ 371 (c)(1),
(2) Date: Aug. 24, 2022

(87) PCT Pub. No.: WO2021/186672
PCT Pub. Date: Sep. 23, 2021

(65) Prior Publication Data
US 2023/0081660 A1 Mar. 16, 2023

(51) Int. Cl.
G06F 18/40 (2023.01)
G01S 13/90 (2006.01)
G06F 18/21 (2023.01)
G06F 18/214 (2023.01)
G06T 3/40 (2024.01)

(52) U.S. Cl.
CPC .......... *G06F 18/40* (2023.01); *G01S 13/9021* (2019.05); *G06F 18/214* (2023.01); *G06F 18/2163* (2023.01); *G06T 3/40* (2013.01)

(58) Field of Classification Search
None
See application file for complete search history.

(56) References Cited

U.S. PATENT DOCUMENTS

| 9,087,401 B1* | 7/2015 | Zheng | G06T 15/00 |
| 2007/0110338 A1* | 5/2007 | Snavely | G06F 16/22 382/190 |

(Continued)

FOREIGN PATENT DOCUMENTS

| JP | 2012-038244 A | 2/2012 |
| JP | 2013-117860 A | 6/2013 |

(Continued)

OTHER PUBLICATIONS

International Search Report for PCT Application No. PCT/JP2020/012305, mailed on Jun. 30, 2020.

*Primary Examiner* — Ryan M Gray
(74) *Attorney, Agent, or Firm* — Sughrue Mion, PLLC

(57) ABSTRACT

An image processing apparatus according to the present invention includes: an extracting unit configured to extract a candidate image, which is an image of a candidate region specified in accordance with a preset criterion, from a target image to be a target for an annotation process, and also extract a corresponding image, which is an image of a corresponding region corresponding to the candidate region, from a reference image that is an image corresponding to the target image; a displaying unit configured to display the candidate image and the corresponding image so as to be able to compare the images with each other; and an input accepting unit configured to accept input of input information for the annotation process for the candidate image.

13 Claims, 18 Drawing Sheets

(56) References Cited

U.S. PATENT DOCUMENTS

| | | | |
|---|---|---|---|
| 2011/0043402 A1 | 2/2011 | Sasakawa | |
| 2012/0039527 A1 | 2/2012 | Qi et al. | |
| 2018/0040153 A1* | 2/2018 | Tanigawa | G06T 3/0018 |
| 2020/0401854 A1* | 12/2020 | Peng | G06F 18/2148 |

FOREIGN PATENT DOCUMENTS

| | | |
|---|---|---|
| JP | 5246391 B | 7/2013 |
| JP | 2018-026104 A | 2/2018 |
| JP | 2018-101910 A | 6/2018 |
| JP | 2019-220073 A | 12/2019 |

\* cited by examiner

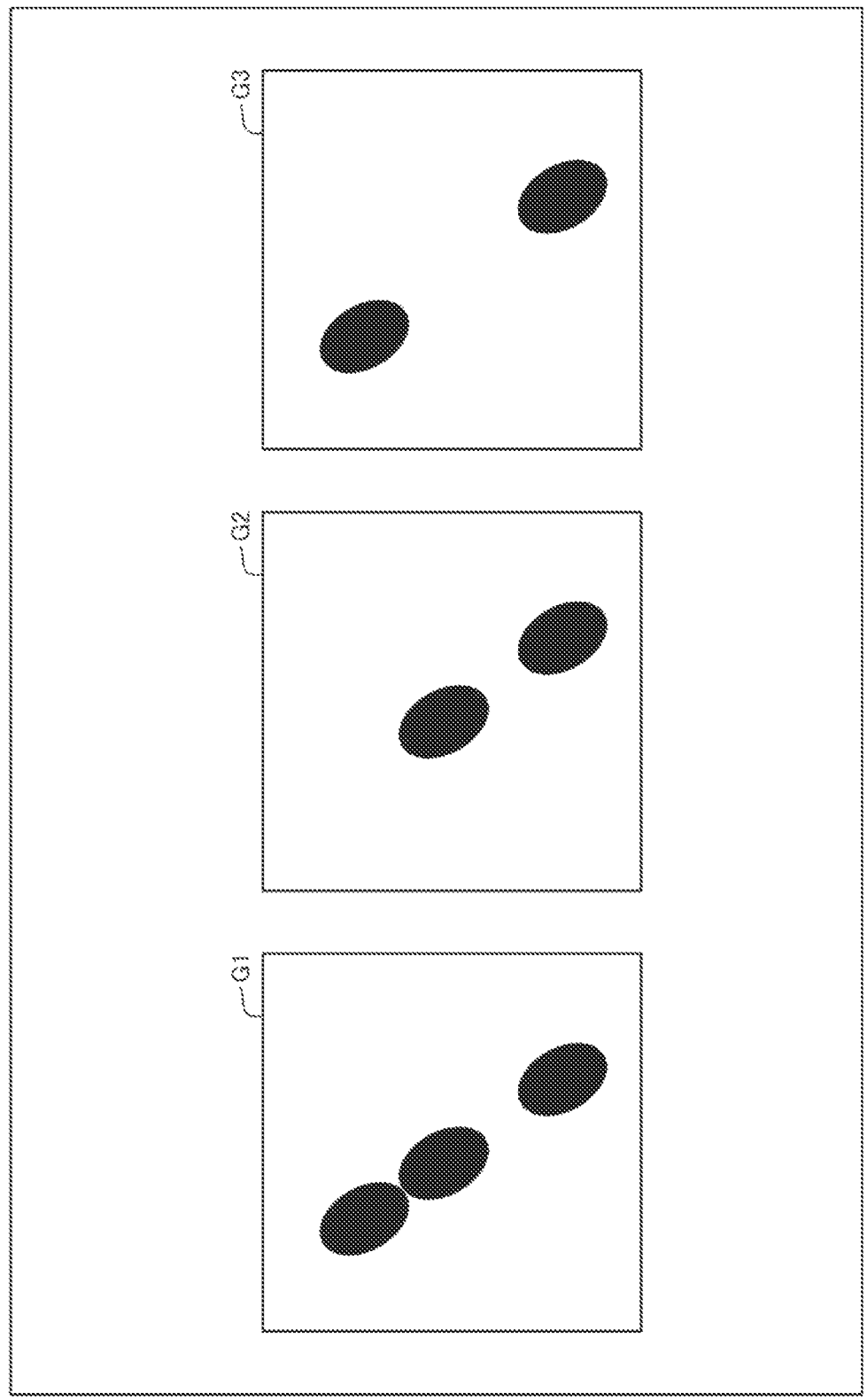

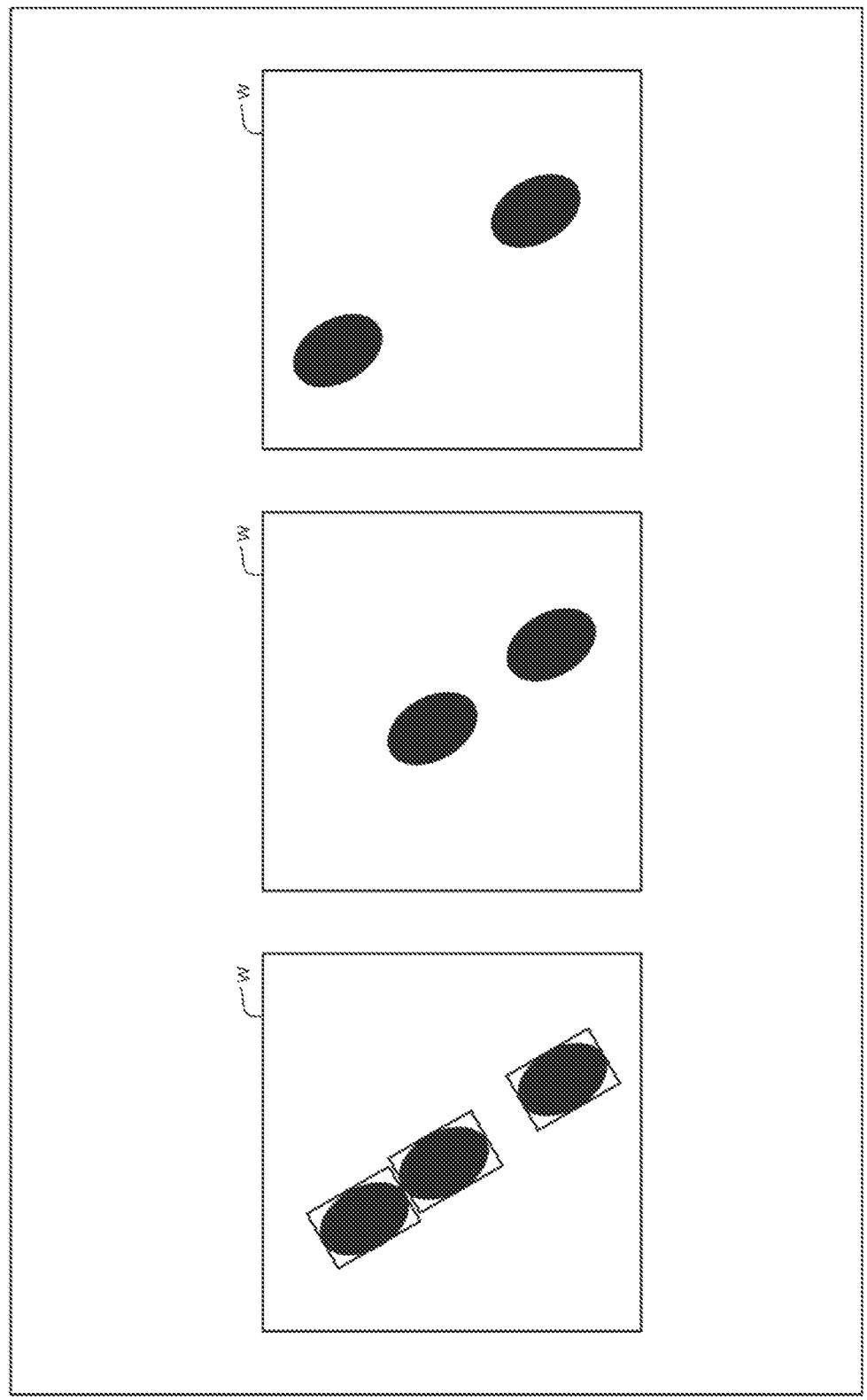

IMAGE PROCESSING METHOD

This application is a National Stage Entry of PCT/JP2020/012305 filed on Mar. 19, 2020, the contents of all of which are incorporated herein by reference, in their entirety.

TECHNICAL FIELD

The present invention relates to an image processing method, an image processing system, and a program.

BACKGROUND ART

In order to effectively utilize captured images such as satellite images, automatic analysis of captured images by various methods is required. For example, in the technique disclosed in Patent Document 1, an image is generated by combining a synthetic aperture radar (SAR) image and an optical image of the ground surface taken from high in the skies, and the type of an object on the ground surface is discriminated from the image.

On the other hand, in order to develop an analysis method such as extracting or discriminating an object from an image and to evaluate performance, data with the correct answer prepared is first required. That is to say, the analysis method is developed and the performance is evaluated by performing annotation, which is labeling an object an existing image, and learning the annotated data.

Patent Document 1: Japanese Patent Publication No. JP 5246391

However, in the case of annotating an object in an image such as a satellite image created by a synthetic aperture radar, it is difficult to discriminate the content of the image itself, and many errors may be included in a case where the annotation is manually performed by a person. For example, in the case of performing the annotation by enclosing an object in an image with a solid-line rectangle, annotation shown in FIG. 1A is correct, whereas errors may occur as shown in FIG. 1B such as an incorrect boundary between the same type of objects (see region a) and missing of small objects (see region b). Thus, in a case where annotation on an object is manually performed, there arises a problem that the accuracy of the annotation lowers.

SUMMARY

Accordingly, an object of the present invention is to provide an image processing method, an image processing system and a program which can solve the abovementioned problem that in a case where annotation on an object is manually performed, the accuracy of the annotation lowers.

An image processing method as an aspect of the present invention includes: extracting a candidate image, which is an image of a candidate region specified in accordance with a preset criterion, from a target image to be a target for an annotation process, and also extracting a corresponding image, which is an image of a corresponding region corresponding to the candidate region, from a reference image that is an image corresponding to the target image; displaying the candidate image and the corresponding image so as to be able to compare the images with each other; and accepting input of input information for the annotation process for the candidate image.

Further, an image processing apparatus as an aspect of the present invention includes: an extracting unit configured to extract a candidate image, which is an image of a candidate region specified in accordance with a preset criterion, from a target image to be a target for an annotation process, and also extract a corresponding image, which is an image of a corresponding region corresponding to the candidate region, from a reference image that is an image corresponding to the target image; a displaying unit configured to display the candidate image and the corresponding image so as to be able to compare the images with each other; and an input accepting unit configured to accept input of input information for the annotation process for the candidate image.

Further, a program as an aspect of the present invention is a computer program comprising instructions for causing an information processing apparatus to realize: an extracting unit configured to extract a candidate image, which is an image of a candidate region specified in accordance with a preset criterion, from a target image to be a target for an annotation process, and also extract a corresponding image, which is an image of a corresponding region corresponding to the candidate region, from a reference image that is an image corresponding to the target image; a displaying unit configured to display the candidate image and the corresponding image so as to be able to compare the images with each other; and an input accepting unit configured to accept input of input information for the annotation process for the candidate image.

With the configurations as described above, the present invention can prevent that in a case where annotation on an object is manually performed, the accuracy of the annotation lowers.

BRIEF DESCRIPTION OF DRAWINGS

FIG. 6A is a view showing a state of image processing by the image processing apparatus disclosed in FIG. 2;

FIG. 7A is a view showing a state of image processing by the image processing apparatus disclosed in FIG. 2;

FIG. 8 is a flowchart showing an operation of the image processing apparatus disclosed in

FIG. 2;

EXAMPLE EMBODIMENTS

First Example Embodiment

Figure 2:
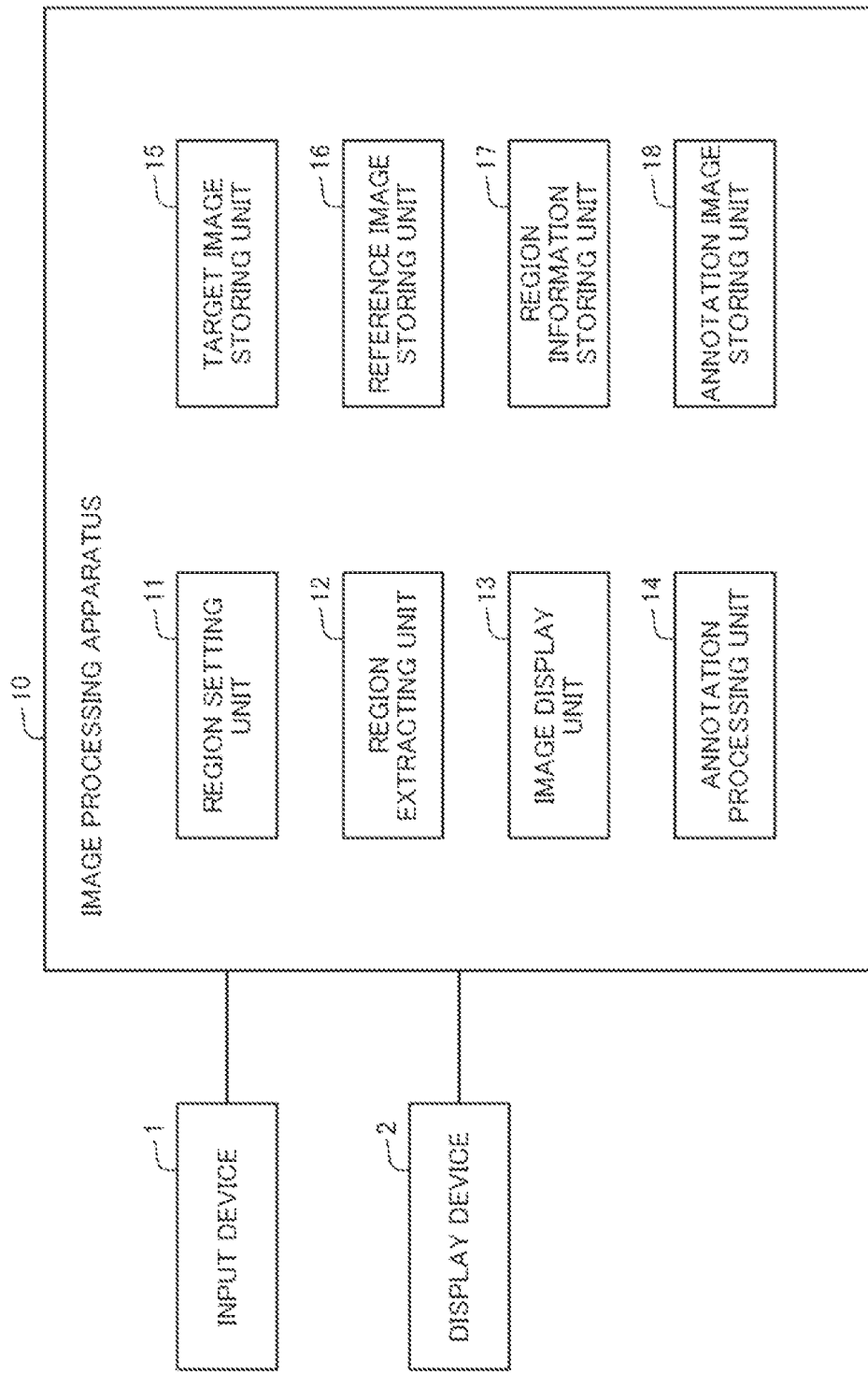
FIG. 2 is a block diagram showing a configuration of an image processing apparatus in a first example embodiment of the present invention.

A first example embodiment of the present invention will be described with reference to FIGS. 2 to 8. FIG. 2 is a view for describing a configuration of an image processing apparatus, and FIGS. 3 to 8 are views for describing a processing operation of the image processing apparatus.

[Configuration]

Figure 1A:
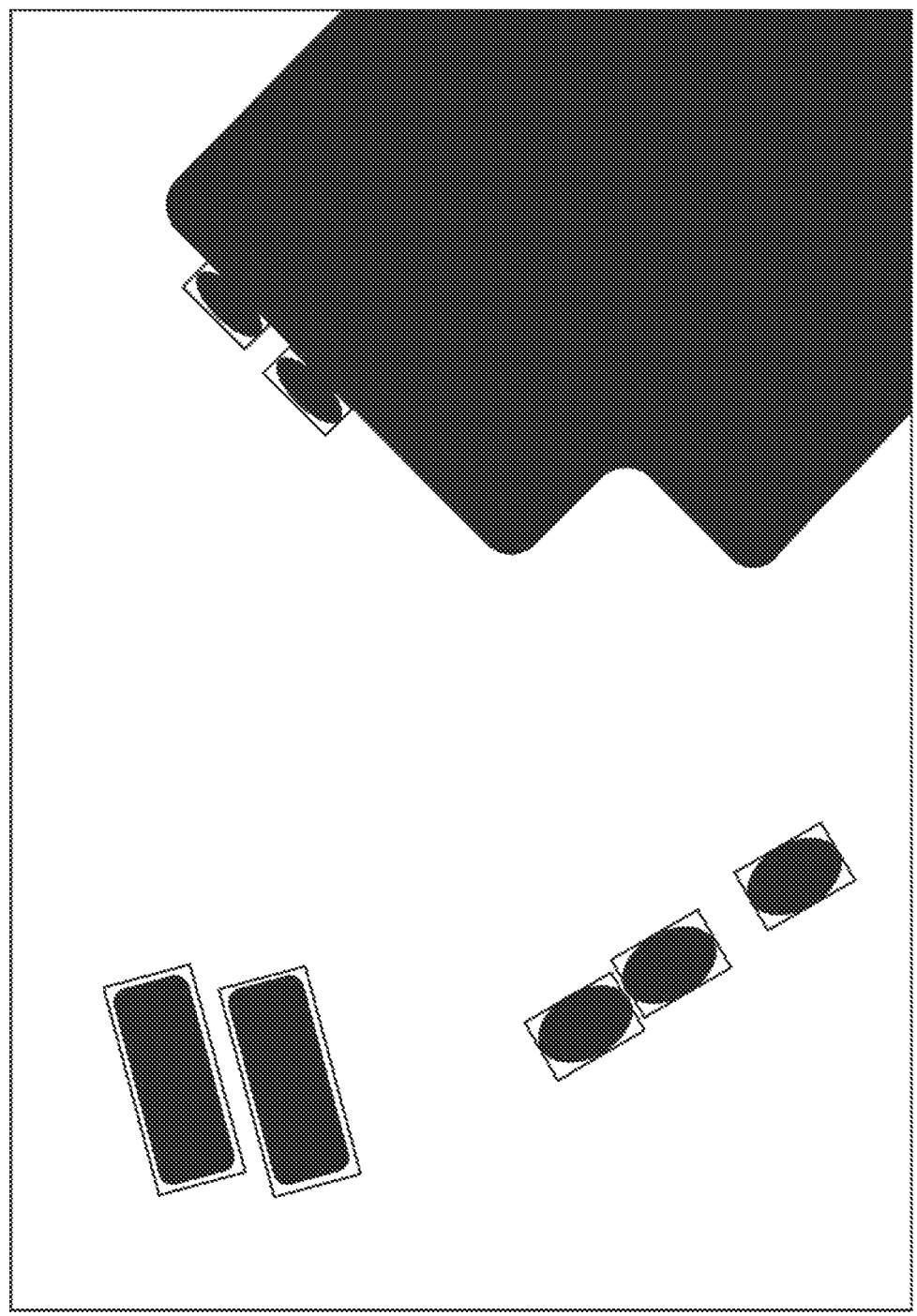
FIG. 1A is a view showing an example of annotation on an object in an image.
Figure 1B:
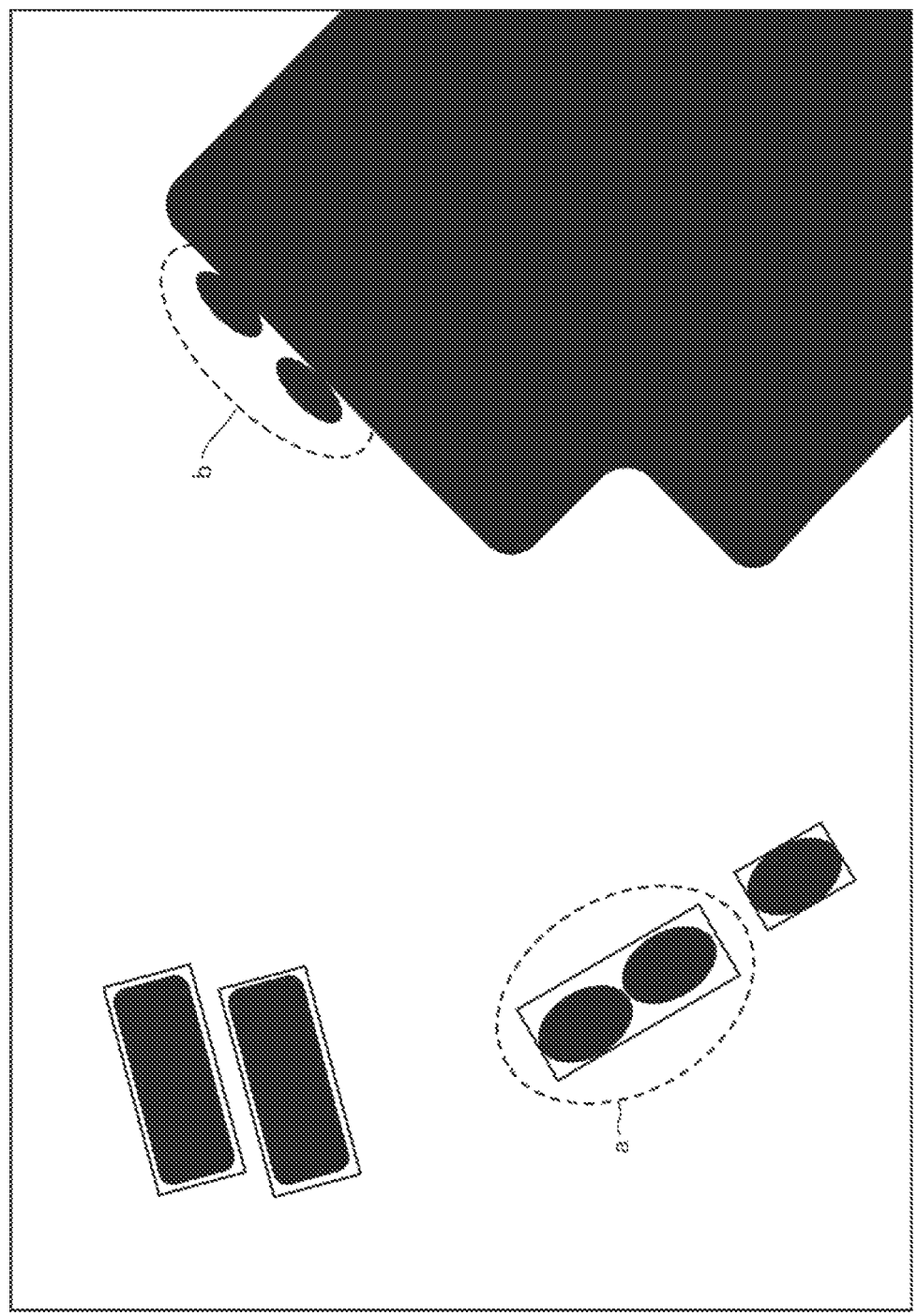
FIG. 1B is a view showing an example of annotation on an object in an image.

An image processing apparatus 10 in this example embodiment is for assisting an operator to annotate an object in an image such as a satellite image taken by a synthetic aperture radar (SAR). For example, the image processing apparatus 10 has a function of displaying an image that is a satellite image as shown in FIG. 1A to an operator, accepting input of annotation information such that the operator encloses an object such as a vessel found in the image with a solid-line rectangle, and accumulating the images after annotation. Then, the image after annotation are used, for example, as learning data for machine learning.

An image processed by the image processing apparatus 10 is not limited to a satellite image taken by a synthetic aperture radar, and may be any image. For example, the image processing apparatus 10 may be used for annotating a specific lesion location in an image assuming the target for processing is an image taken by an endoscope camera, and may be used for any purpose.

The image processing apparatus 10 is configured by one or a plurality of information processing apparatuses including an arithmetic logic unit and a storage unit. Then, as shown in FIG. 2, the image processing apparatus 10 includes a region setting unit 11, a region extracting unit 12, an image display unit 13, and an annotation processing unit 14. The respective functions of the region setting unit 11, the region extracting unit 12, the image display unit 13 and the annotation processing unit 14 can be realized by execution of a program for realizing each of the functions stored in the storage unit by the arithmetic logic unit. The image processing apparatus 10 also includes a target image storing unit 15, a reference image storing unit 16, a region information storing unit 17, and an annotation image storing unit 18. The target image storing unit 15, the reference image storing unit 16, the region information storing unit 17, and the annotation image storing unit 18 are configured by the storage unit. Moreover, to the image processing apparatus 10, an input device 1 including a keyboard and a mouse, and a display device 2 including a display are connected. Below, the respective components will be described in detail.

Figure 3A:
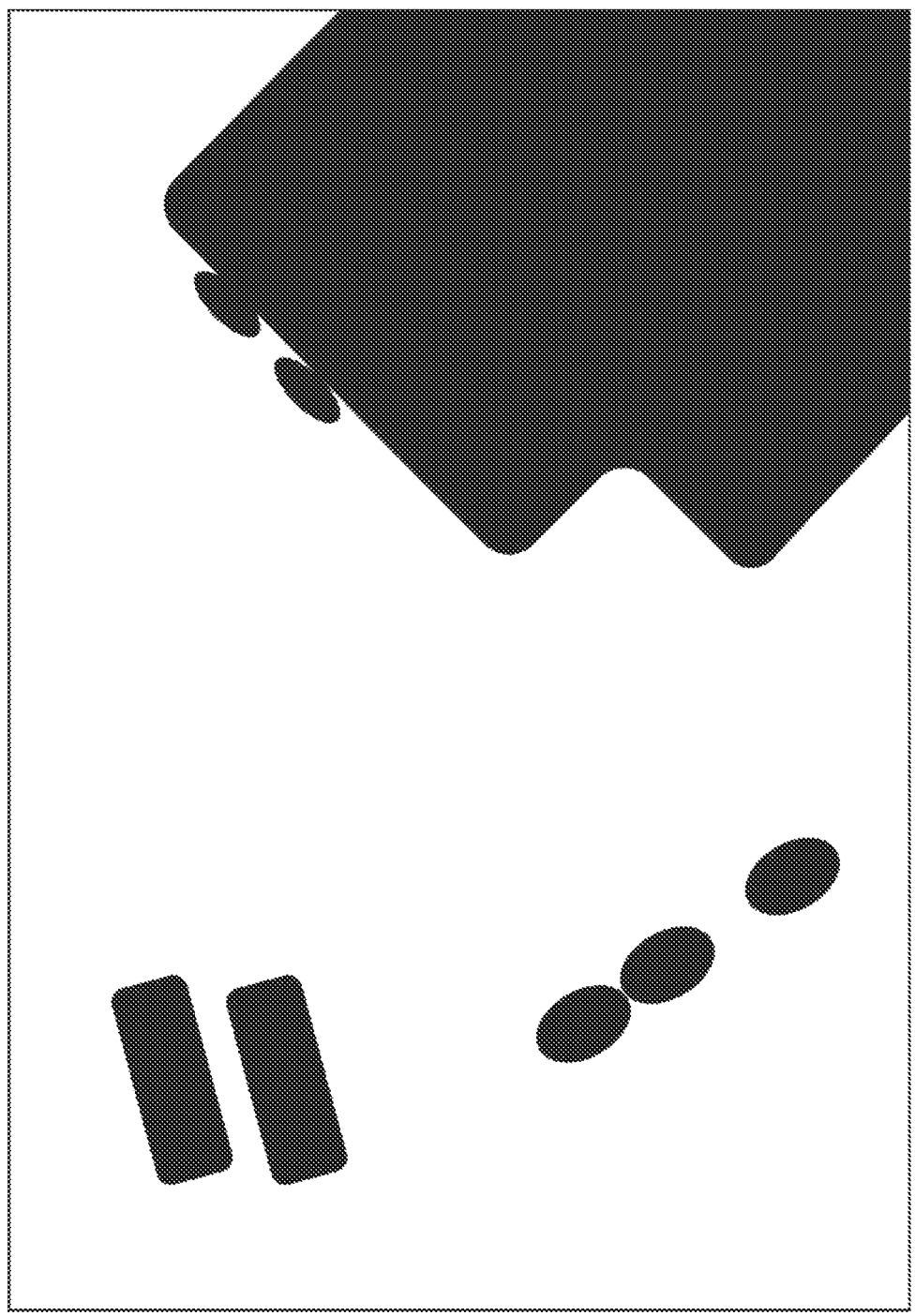
FIG. 3A is a view showing an example of an image processed by the image processing apparatus disclosed in FIG. 2.

In the target image storing unit 15, a target image that is the target for an annotation process is stored. For example, the target image is a satellite image taken by a synthetic aperture radar as shown in FIG. 3A, and is an image of the surface of the earth including the sea. Since the target image is an image taken so as to include the sea as described above, a vessel shown in the image can be an object to be annotated.

Figure 3B:
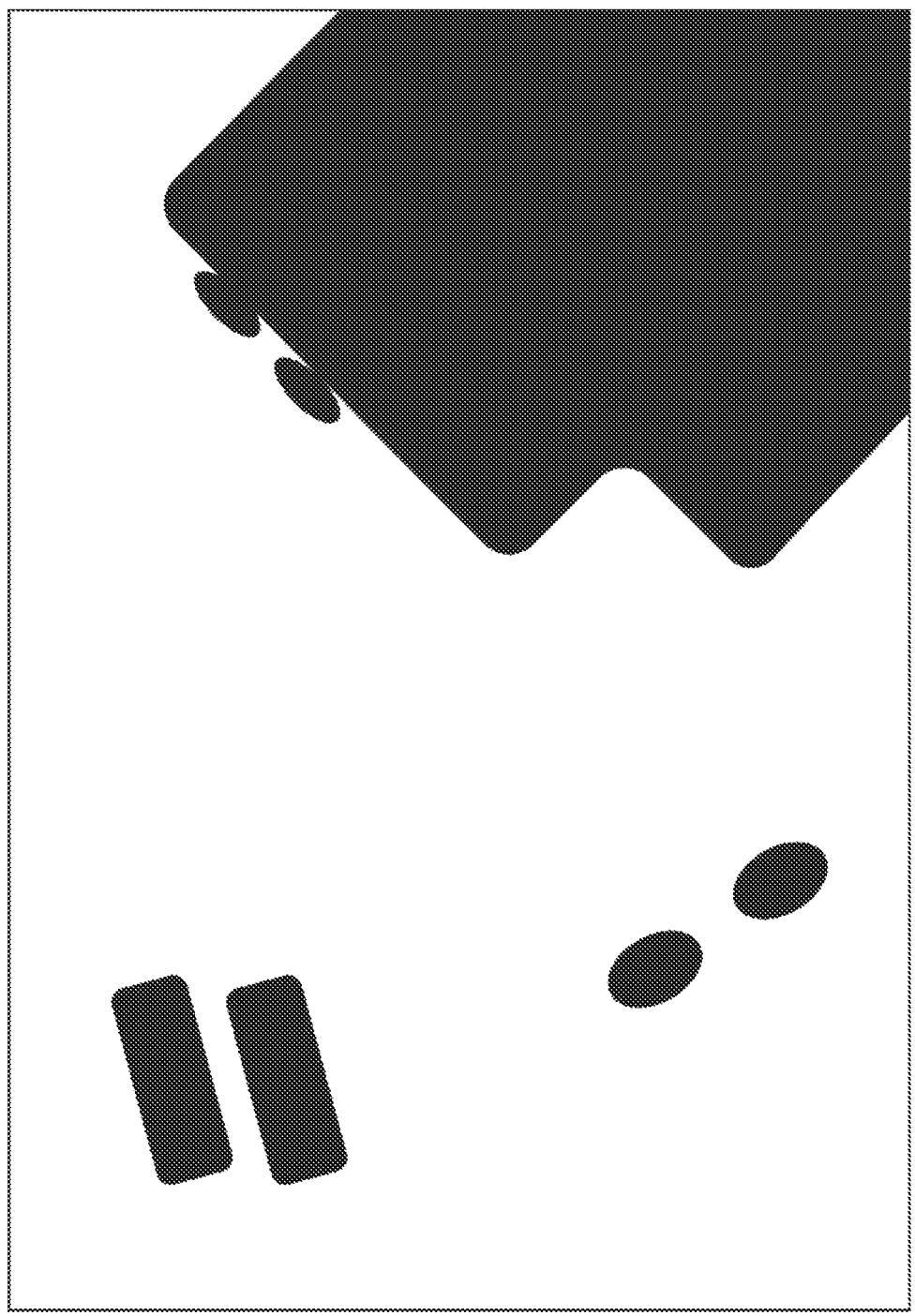
FIG. 3B is a view showing an example of an image processed by the image processing apparatus disclosed in FIG. 2.
Figure 4:
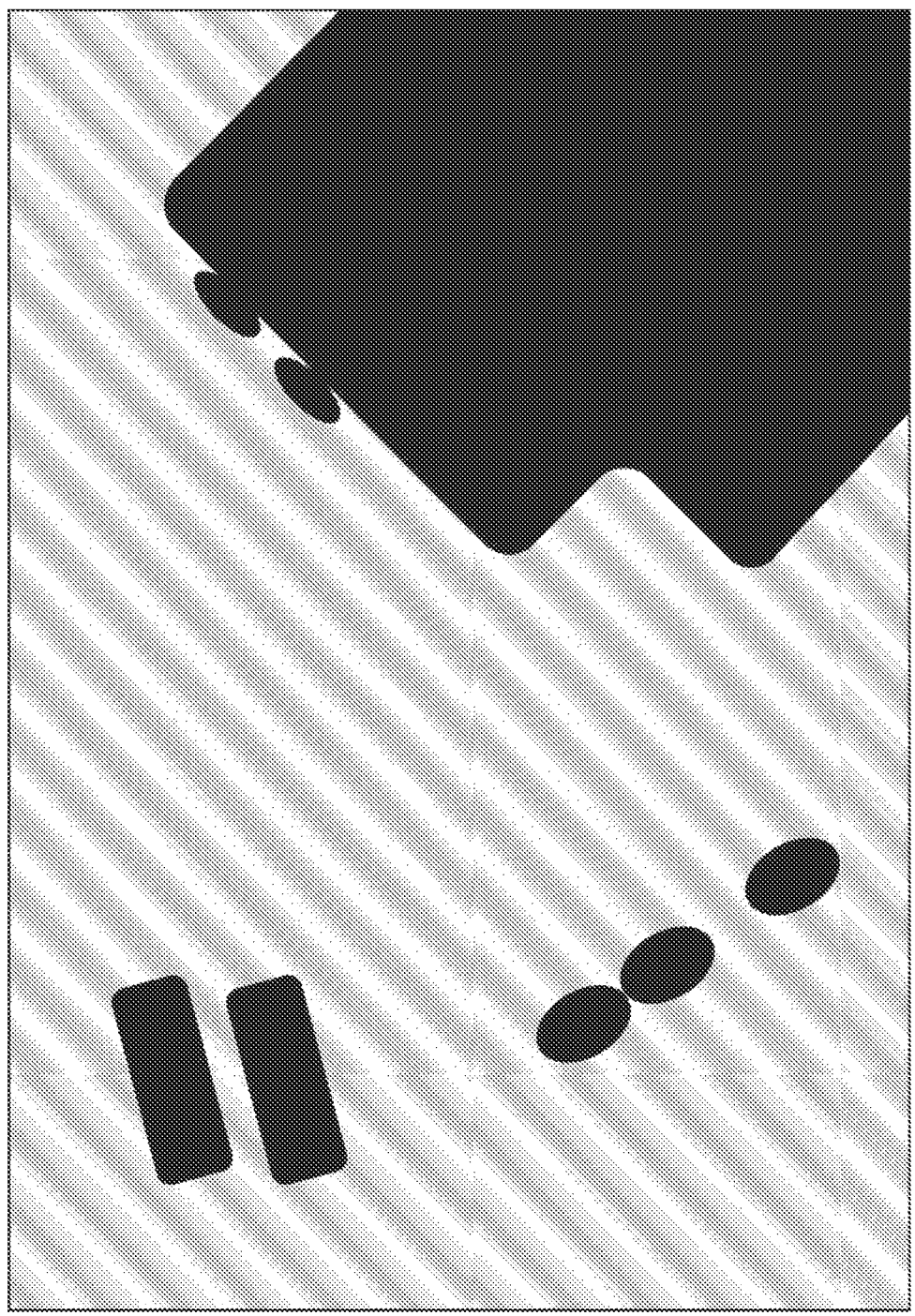
FIG. 4 is a view showing a state of image processing by the image processing apparatus disclosed in FIG. 2.

In the reference image storing unit 16, one or a plurality of reference images are stored, which are satellite images taken by a synthetic aperture radar as well as the abovementioned target image and which are images obtained by shooting the same region as the target image as shown in FIG. 3B. In this example embodiment, it is assumed that two reference images are stored in relation to one target image. Moreover, the reference images are, for example, images taken at different times from time when the target image is taken. As an example, the reference images are a plurality of images sequentially taken every other day since before the target image is taken. Although the reference images are obtained by shooting almost the same regions as the target image, the reference images are not limited to being obtained by shooting totally the same regions, but may be obtained by shooting substantially the same regions. Alternatively, the reference images may be obtained by shooting not substantially the same regions but regions corresponding to the region where the target image is taken.

The region setting unit 11 (extracting unit) sets candidate regions, which are regions that may include an object (for example, a vessel) to be annotated in the target image and the reference images. In this example embodiment, since an object to be annotated is a vessel, the region setting unit 11 sets all regions that may be a target object based on the image brightness value as candidate regions in the target image as shown by hatching in FIG. 4, and stores the coordinates on the target image of the candidate regions into the region information storing unit 17. However, the region setting unit 11 may set candidate regions by another method. For example, the region setting unit 11 may set regions on the sea based on position information of a region where the target image is taken as candidate regions by using map information.

Figure 5A:
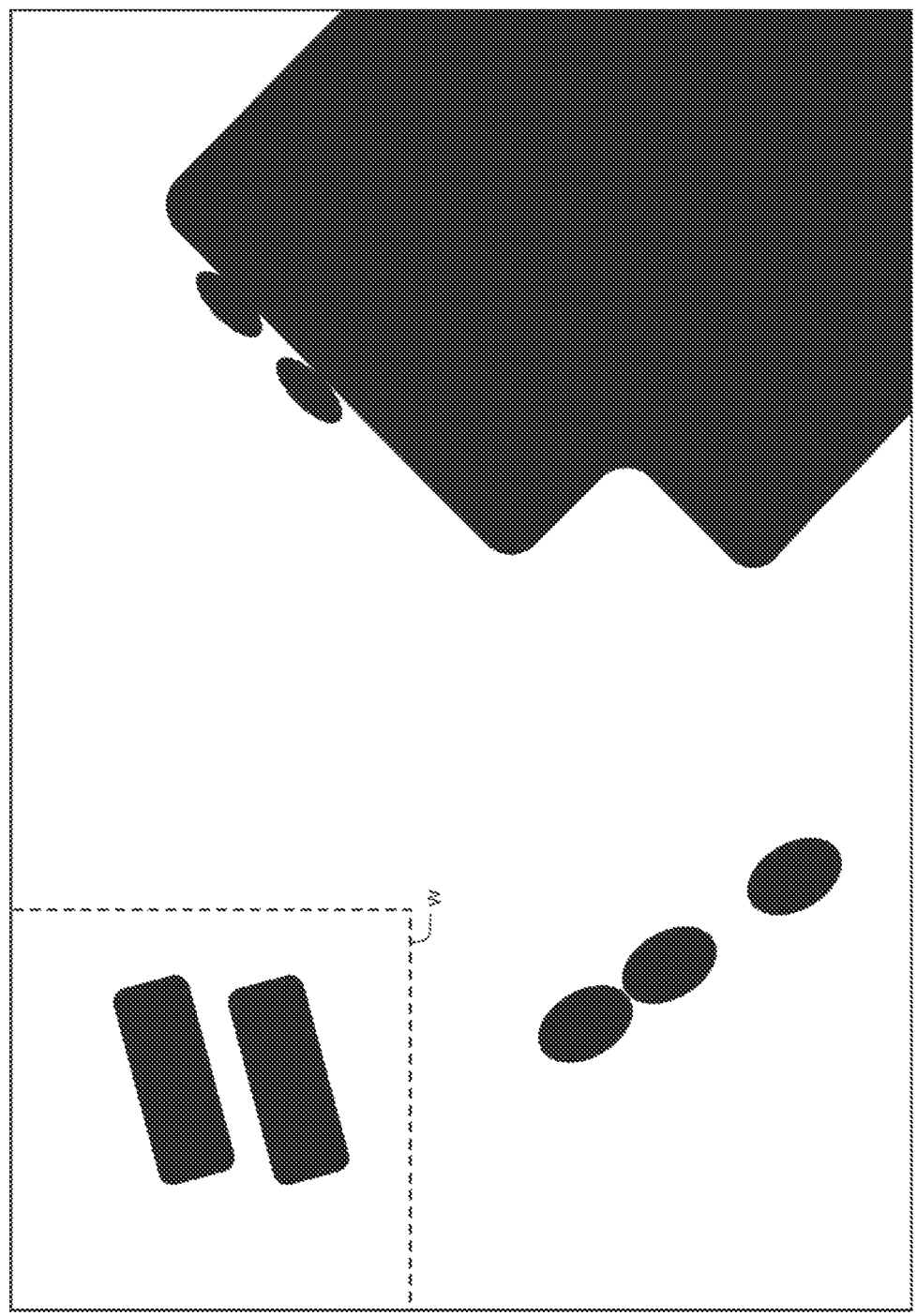
FIG. 5A is a view showing a state of image processing by the image processing apparatus disclosed in FIG. 2.
Figure 5B:
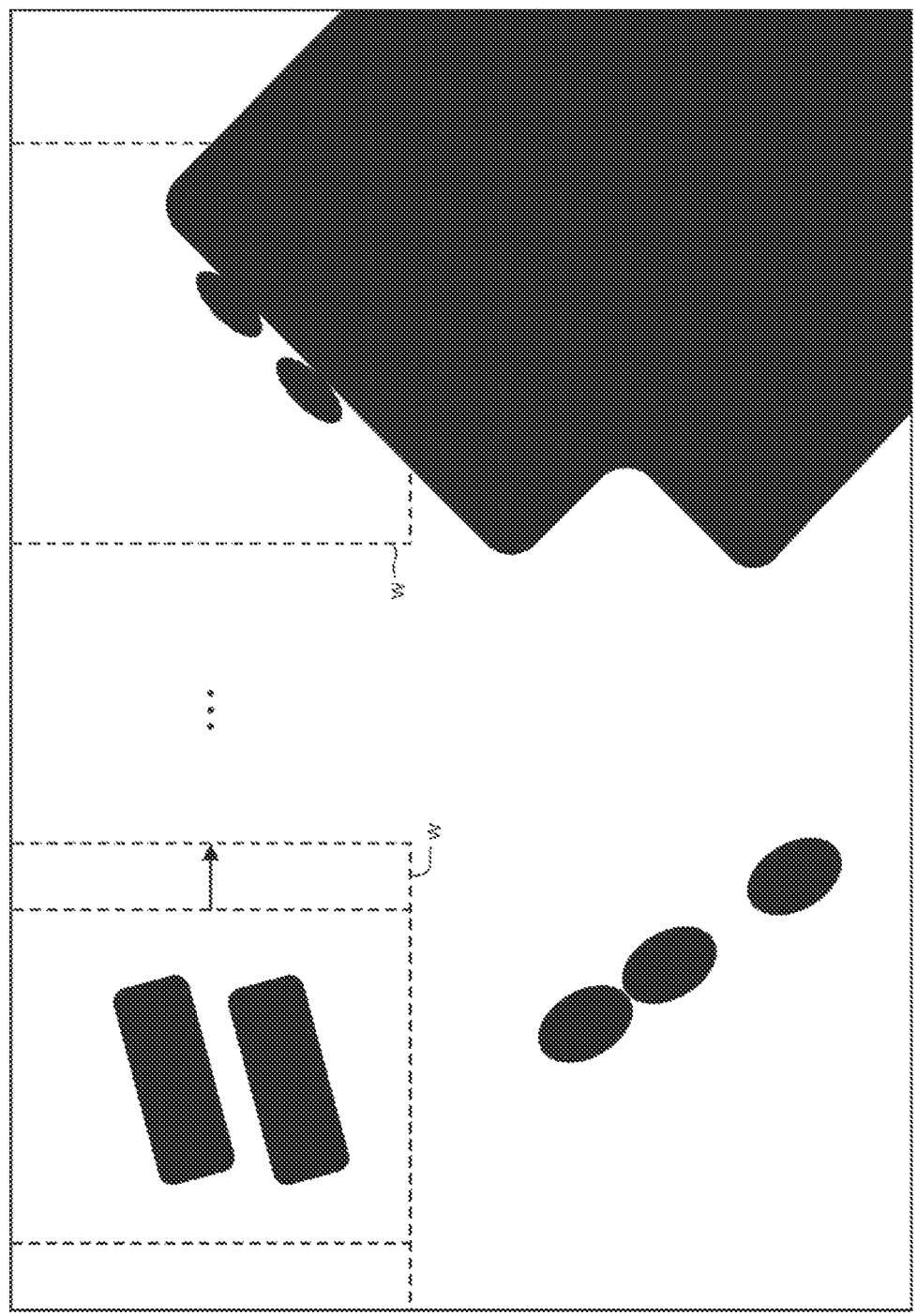
FIG. 5B is a view showing a state of image processing by the image processing apparatus disclosed in FIG. 2.
Figure 5C:
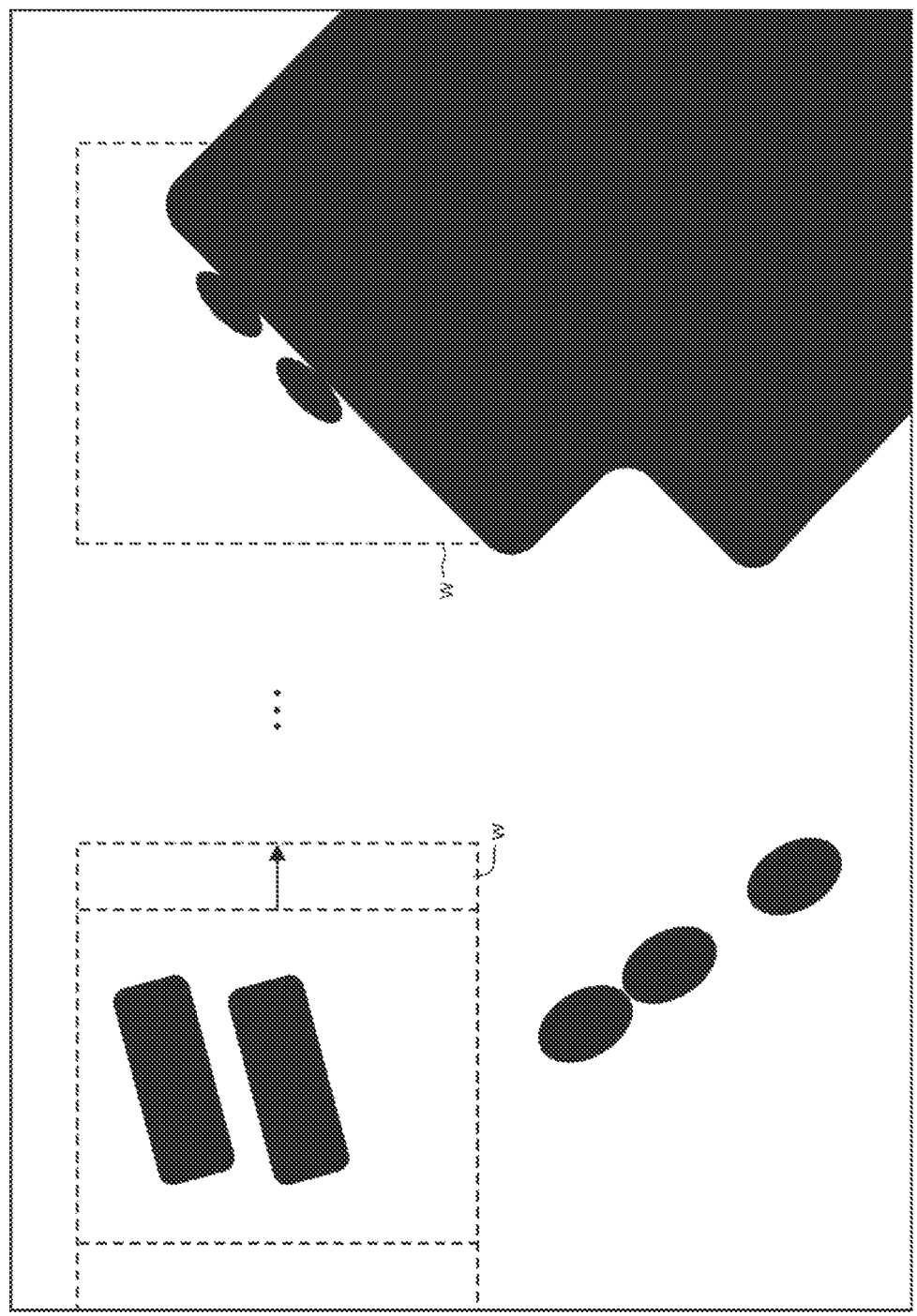
FIG. 5C is a view showing a state of image processing by the image processing apparatus disclosed in FIG. 2.
Figure 5D:
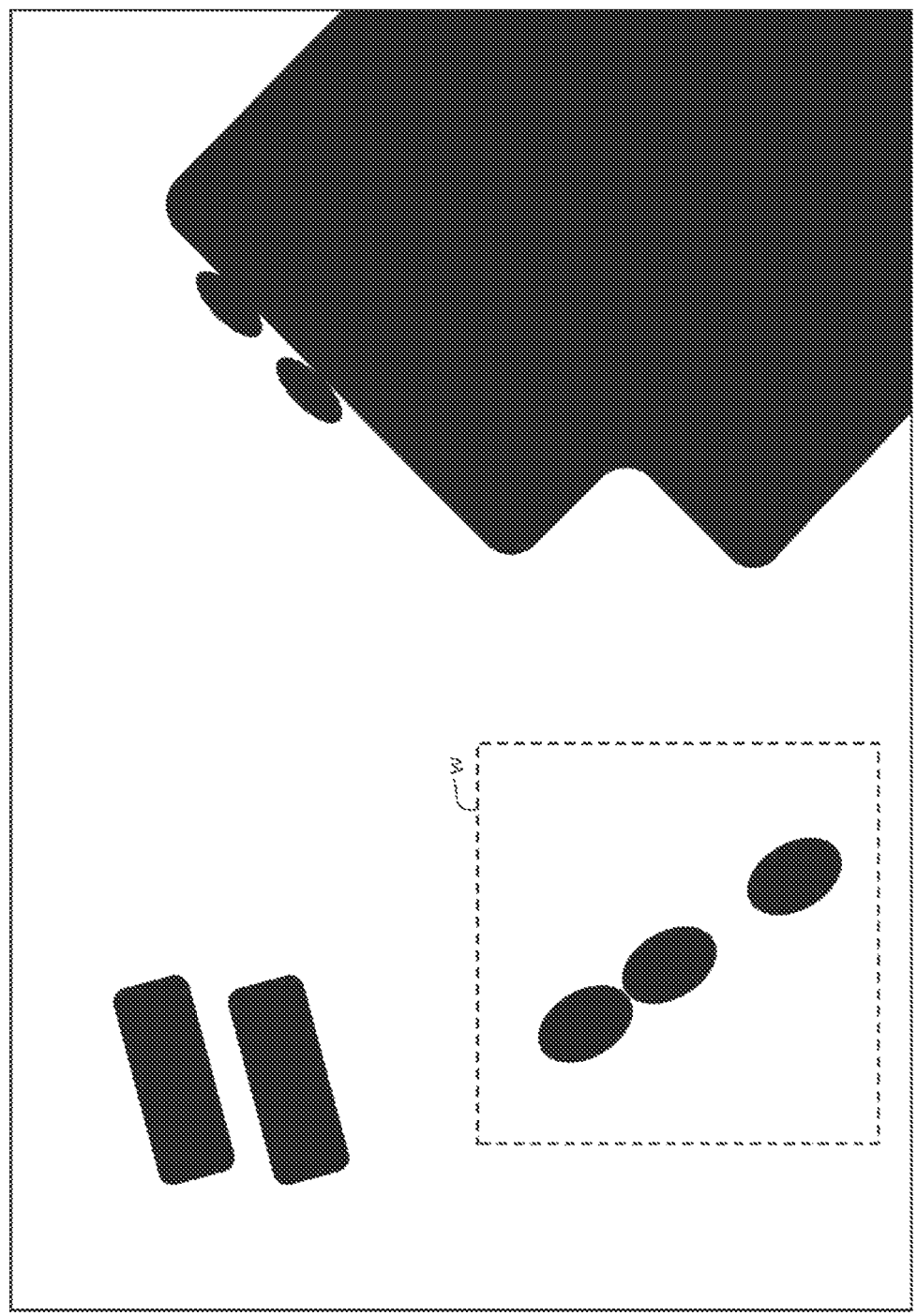
FIG. 5D is a view showing a state of image processing by the image processing apparatus disclosed in FIG. 2.

Further, the region setting unit 11 sets a candidate region to be enlarged and displayed when performing annotation on the target image based on the set candidate regions, and stores the coordinates on the target image into the region information storing unit 17. Specifically, as shown by dotted line in FIG. 5A, the region setting unit 11 sets, as a candidate region w, a rectangular region smaller than the entire target image including at least part of a region set as the candidate regions in the target image. At the time, the region setting unit 11 sets a plurality of candidate regions w so as to be able to cover the entire region of the candidate regions of the target image, and stores the coordinates on the target image of each of the candidate regions w into the region information storing unit 17. For example, first, as shown in FIG. 5B, the region setting unit 11 sequentially slides a candidate region w set in the upper right corner region of the target image in the horizontal direction to set a plurality of other candidate regions w. Moreover, as shown in FIG. 5C, the region setting unit 11 slides the candidate region w also in the vertical direction and then sequentially slides the candidate region w in the horizontal direction to set a plurality of other candidate regions w. At the time, the candidate regions w may or may not overlap each other.

The region extracting unit 12 (extracting unit) extracts an image corresponding to the candidate region w set as described above from each of the target image and the reference images. At the time, the region extracting unit 12 specifies one candidate region w from among the set candidate regions w, and retrieves the coordinates on the target image of the candidate region from the region information storing unit 17. Then, based on the retrieved coordinates, the region extracting unit 12 extracts an image on the target image located in the specified candidate region w as a candidate image G1, and extracts images on the reference images located in the specified candidate region w as corresponding images G2 and G3. As an example, in the case of specifying the candidate region w shown in FIG. 5D, the region extracting unit 12 extracts, as the candidate image G1, an image on the target image in the same region as the candidate region w, and extracts, as the corresponding images G2 and G3, respective images on the two reference images in the same region as the candidate region w. The region extracting unit 12 thus extracts the candidate image G1 and the corresponding images G2 and G3 that are the images in almost the same regions from the target image and the reference images G2 and G3.

After extracting the candidate image G1 and the corresponding images G2 and G3 corresponding to the one specified candidate region w from the target image and the reference images and then finishing annotation on the candidate image G1, the region extracting unit 12 changes the candidate region w to specify another candidate region w and extract the candidate image G1 and the corresponding images G2 and G3 corresponding to the other candidate region w as will be described later. For example, the region extracting unit 12 sequentially slides the candidate region w to specify the candidate region w on the target image and the reference images, and sequentially extracts the candidate image G1 and the corresponding image G2 and G3 corresponding to the specified candidate region w.

Figure 6B:
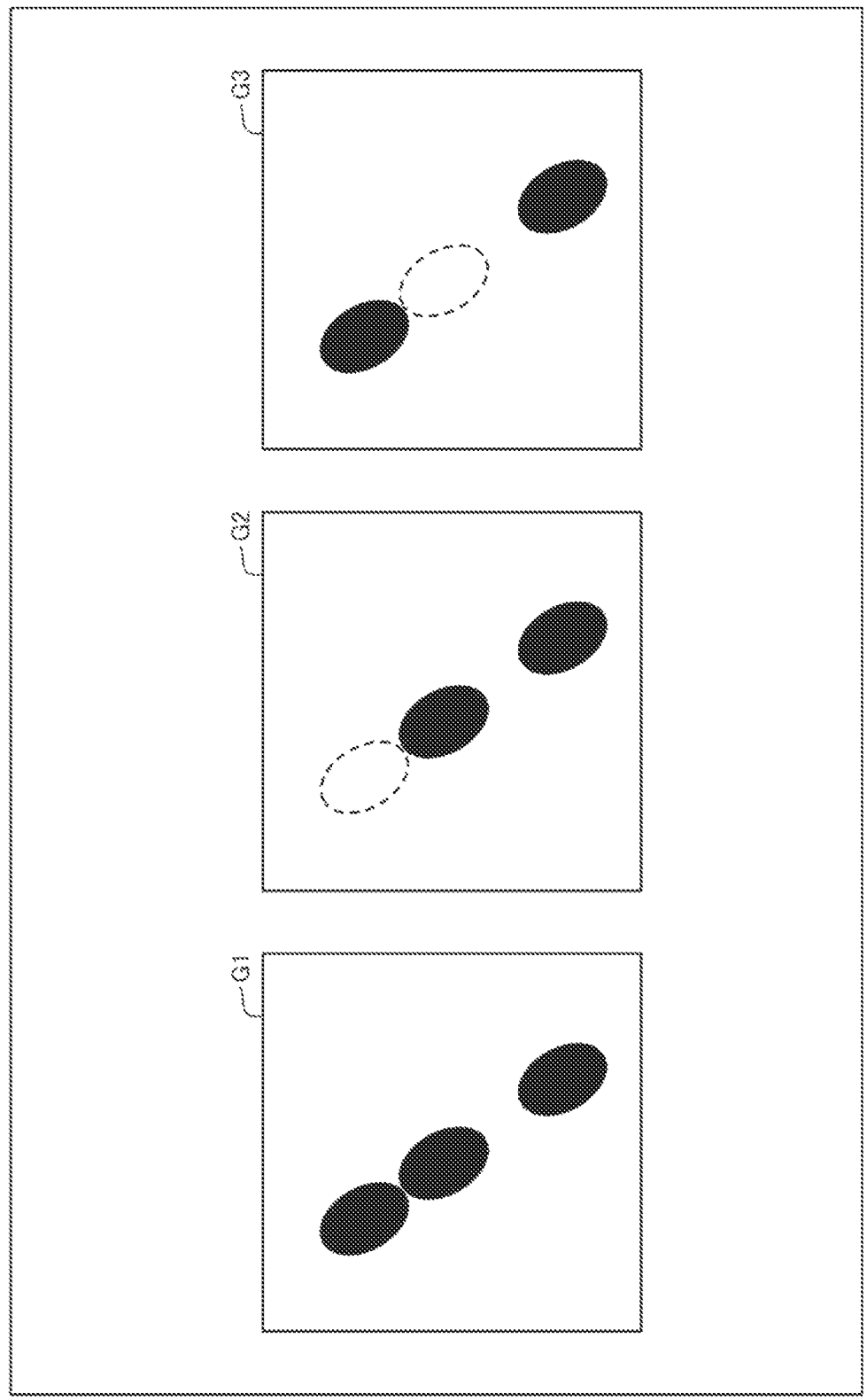
FIG. 6B is a view showing a state of image processing by the image processing apparatus disclosed in FIG. 2.

The image display unit 13 (displaying unit) outputs the candidate image G1 and the corresponding images G2 and G3 corresponding to the one candidate region w extracted as described above to display on the display device 2 so as to be able to compare the images. In particular, in this example embodiment, as shown in FIG. 6A, the image display unit 13 enlarges the candidate image G1 and the two corresponding images G2 and G3 and displays the images side by side on one screen at the same time. By displaying the candidate image G1 and the corresponding images G2 and G3 so as to be able to compare as described above, the operator can compare the three images and thereby recognize existence of three objects because it varies for each target object whether or not the object exists in the same position as shown by dotted line in FIG. 6B.

In the example of FIG. 6A, since there are two reference images corresponding to one target image, the image display unit 13 displays three images at the same time. Meanwhile, the image display unit 13 may first display the candidate image G1 and one corresponding image G2 at the same time, and then display the candidate image G1 and the other corresponding image G3 at the same time. However, the image display unit 13 is not necessarily limited to displaying the candidate image and the corresponding image at the same time, and may alternately display the candidate image and the corresponding images and thereby display the candidate image and the corresponding image so as to be able to compare. At the time, in a case where there are a plurality of corresponding images corresponding to a candidate image, the image display unit 13 may display the candidate image and thereafter sequentially display the plurality of corresponding images like a slide show. Alternatively, when repeatedly and alternately displaying a candidate image and corresponding images, the image display unit 13 may sequentially change the corresponding image to another corresponding image and display. Moreover, the image display unit 13 does not necessarily need to enlarge a candidate image and corresponding images when displaying.

The annotation processing unit 14 (input accepting unit) accepts annotation information, which is input information for an annotation process input through the input device 1 by the operator, in relation to the candidate image G1 displayed on the display device 2. For example, annotation information input by the operator is information which specifies an object existing on the candidate image G1 and, as an example, a rectangle diagram enclosing the object. The annotation processing unit 14 may accept annotation information input in relation to the candidate image G displayed so as to be compared with the corresponding images G2 and G3 as shown in FIG. 6A, and may separately display only the candidate image G1 and accept annotation information input on the display.

Figure 7B:
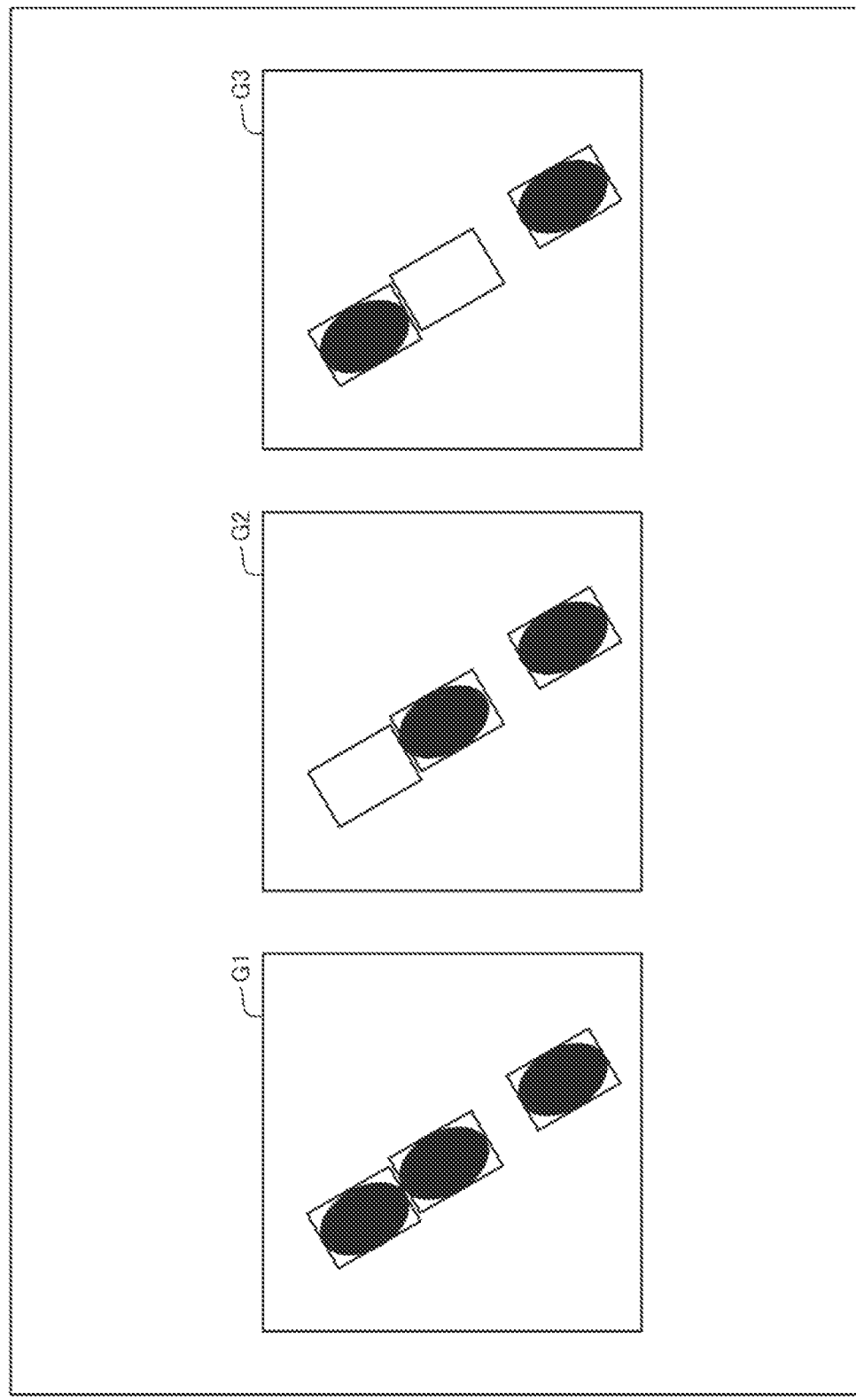
FIG. 7B is a view showing a state of image processing by the image processing apparatus disclosed in FIG. 2.

Then, the annotation processing unit 14 displays the annotation information input by the operator on the candidate image G1. In this example embodiment, the annotation information input by the operator is information which specifies an object existing on the candidate image G1 and, as an example, a rectangle diagram enclosing the object. Therefore, the annotation processing unit 14 displays rectangle diagrams input so as to enclose three objects on the candidate image G1 as shown in FIG. 7A. At the time, the annotation processing unit 14 also displays information (corresponding input information) corresponding to the rectangle diagrams displayed on the candidate image G1, on the corresponding images G2 and G3. For example, as shown in FIG. 7B, the annotation processing unit 14 displays three rectangle diagrams having the same shapes in the same positions on the corresponding images G2 and G3 as the three rectangle diagrams displayed on the candidate image G1.

The annotation processing unit 14 associates the annotation information specifying the object input on the candidate image G1 with the candidate image G1 to generate as an annotation image and stores into the annotation image storing unit 18. The annotation image thus generated and stored is used as learning data for machine learning, for example.

Then, after generating the annotation image for the candidate image G1 corresponding to one candidate region on the target image as described above, the image processing apparatus 10 changes the candidate region and generates an annotation image for a candidate image G1 corresponding to the candidate region after change in the same manner as described above. Specifically, first, the region setting unit 11 slides the candidate region w as shown in FIGS. 5B and 5C, and sets a next candidate region w. Then, the region extracting unit 12 extracts a candidate image G1 and corresponding images G2 and G3 corresponding to the next candidate region w from the target image and the reference images, respectively. After that, in the same manner as described above, the image display unit 13 displays the candidate image G1 and the corresponding images G2 and G3 on the display device 2 so as to be able to compare, and the annotation processing unit 14 accepts annotation information for the candidate image G1 by the operator, displays the annotation information on the candidate image G1, and generates an stores an annotation image. Thus, the image processing apparatus 10 generates and stores the annotation image. The annotation image may be an image that the annotation information accepted on each candidate image G1 is associated with the target image.

[Operation]

Figure 8:
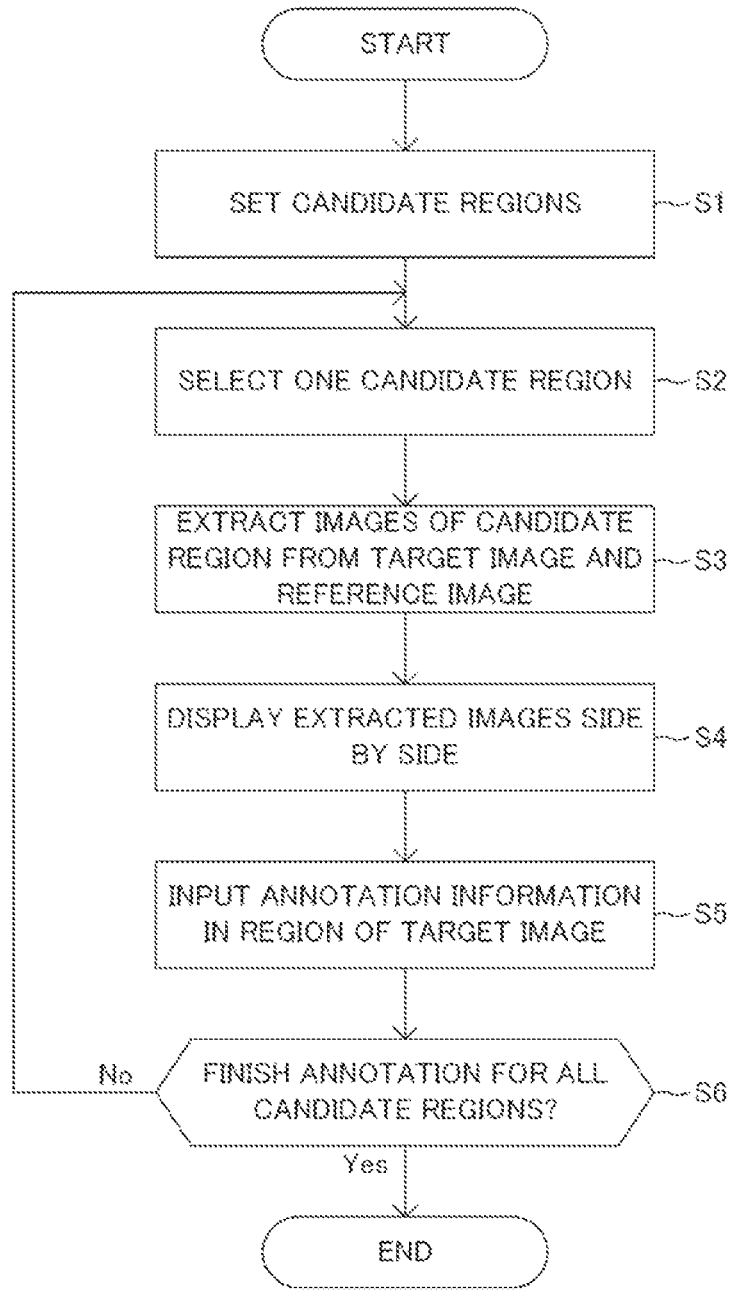

Next, an operation of the above image processing apparatus 10 will be described mainly with reference to a flowchart of FIG. 8. First, the image processing apparatus 10 sets candidate regions, which are regions that may include an object to be annotated, in a target image and a reference image. In this example embodiment, since an object to be annotated is a vessel, the image processing apparatus 10 sets a region of the sea in the target image as candidate regions as indicated by hatching in FIG. 4. Then, the image processing apparatus 10 sets a candidate region, which is a region to be enlarged and displayed at the time of performing annotation on the target image based on the set candidate regions. For example, as indicated by dotted line in FIG. 5A, the image processing apparatus 10 sets, as a candidate region w, a rectangular region that includes at least part of the region set as the candidate regions in the target image and that is smaller than the whole target image. At the time, as shown in FIGS. 5B and 5C, the image processing apparatus 10 sequentially slides the candidate region w in the horizontal direction and the vertical direction to set a plurality of candidate regions w (step S1).

Subsequently, the image processing apparatus 10 selects one candidate region w from among the set candidate regions w (step S2). Then, the image processing apparatus 10 extracts a candidate image G1 and corresponding images G2 and G3 corresponding to the selected one candidate region w from the target image and the reference images, respectively (step s3).

Subsequently, the image processing apparatus 10 outputs the candidate image G1 and corresponding images G2 and G3 corresponding to the one candidate region w extracted as described above to display on the display device 2 so as to be able to compare the images with each other. For example, as shown in FIG. 6A, the image processing apparatus 10 enlarges the candidate image G1 and the two corresponding images G2 and G3, and simultaneously displays the images side by side on one screen (step S4). Consequently, an operator who performs annotation can compare the candidate image G1 with the corresponding images G2 and G3. Therefore, for example, the operator can consider that it varies for each target object whether the target object exists in the same position or does not exist actually as indicated by dotted line in FIG. 6B, and can easily and accurately recognize the object in the candidate image G1.

Subsequently, the image processing apparats 10 accepts annotation information for an annotation process input through the input device 1 by the operator in relation to the candidate image G1 displayed on the display device 2 (step S5). Then, the image processing apparatus 10 displays the accepted annotation information on the candidate image G1 as shown in FIG. 7A. In some cases, the image processing apparatus 10 also displays the annotation information on the corresponding images G2 and G3 as shown in FIG. 7B. After that, the image processing apparatus 10 associates the input annotation information with the candidate image G1, and stores as an annotation image.

After that, until finishing the abovementioned annotation process for all the candidate regions w set in the target image, the image processing apparatus 10 performs the same annotation process as described above while changing the candidate region w (step S6). Then, the stored annotation image is used as learning data for machine learning, for example.

As described above, according to this example embodiment, the candidate image G1 that is part of the target image to be subject to the annotation process and the corresponding images G2 and G3 that are part of the reference images acquired in the same regions as in the target image at different times and that correspond to the candidate image are displayed so that the images can be compared with each other. Consequently, the operator can easily and accurately recognize the object on the candidate image G1. As a result, the operator can easily and accurately annotate the object on the candidate image G1. In particular, in this example embodiment, since the candidate image G1 and the corresponding images G2 and G3 are enlarged and displayed and are simultaneously displayed side by side on the same screen, the operator can perform the annotation with more ease and accuracy.

Second Example Embodiment

Figure 9:
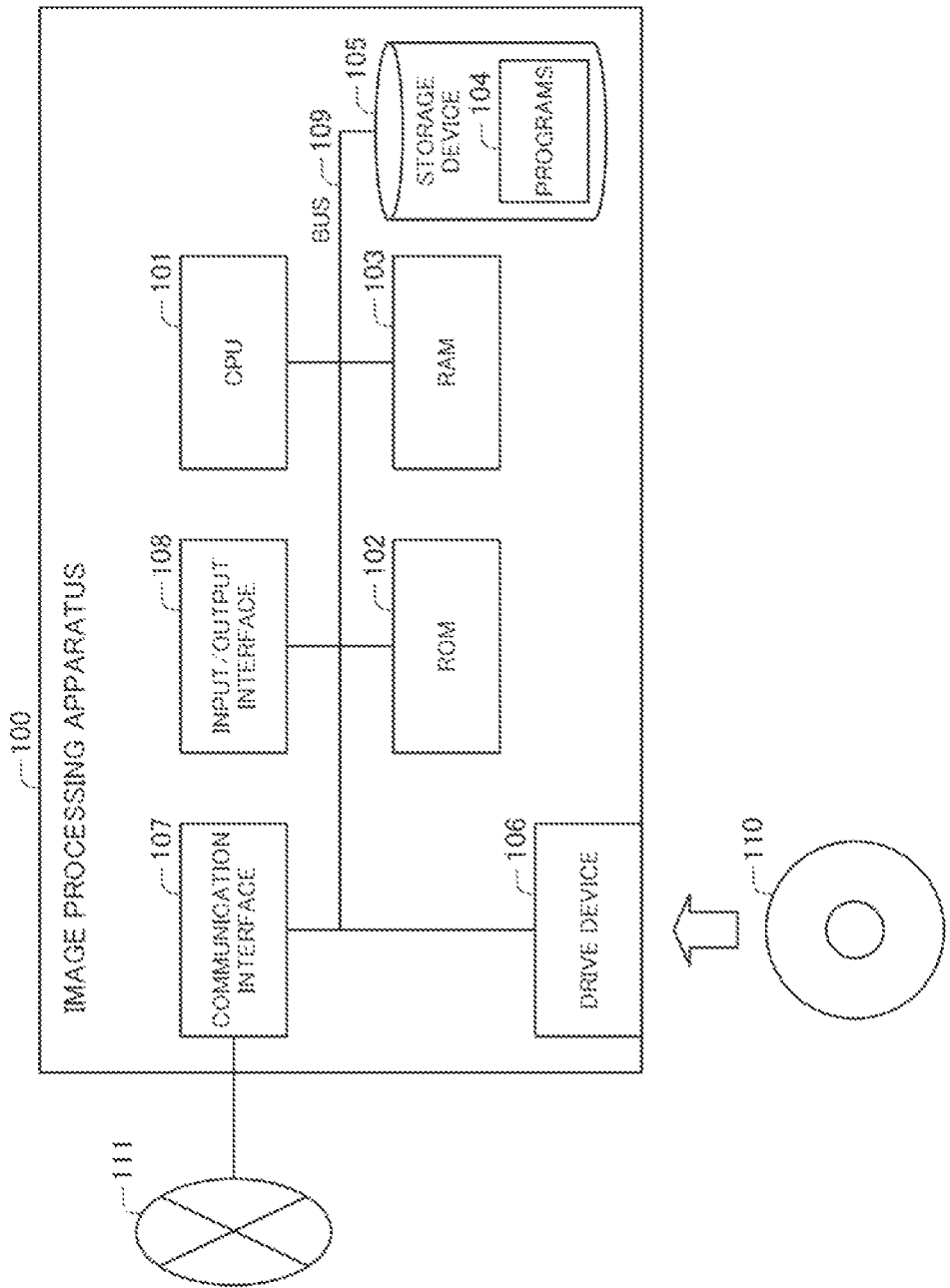
FIG. 9 is a block diagram showing a hardware configuration of an image processing apparatus in a second example embodiment.
Figure 10:
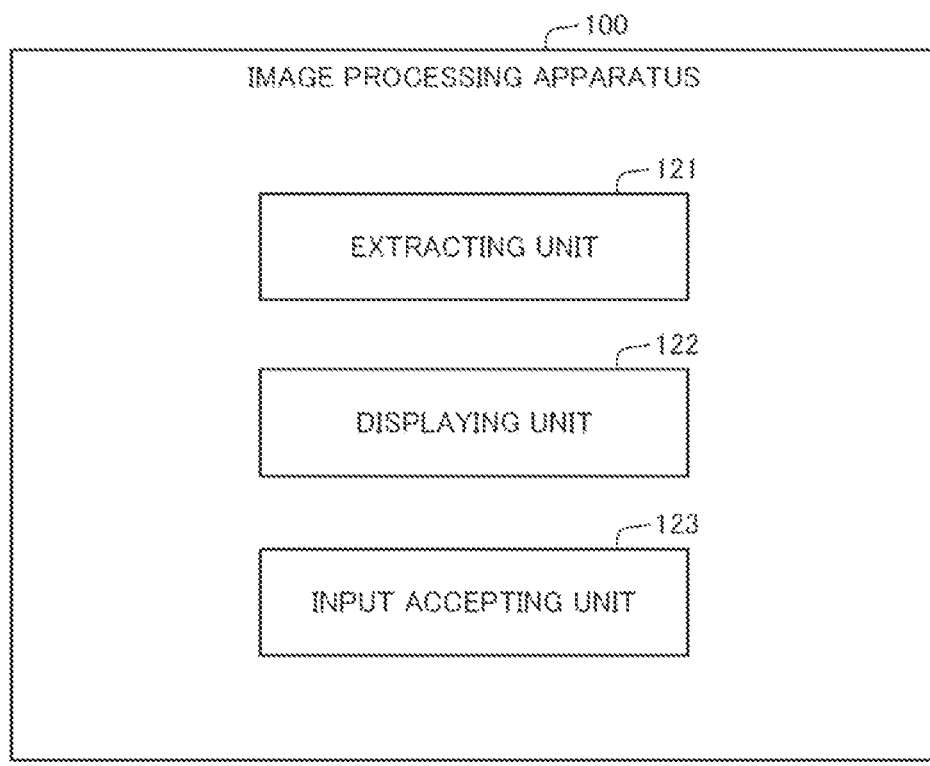
FIG. 10 is a block diagram showing a configuration of the image processing apparatus in the second example embodiment.
Figure 11:
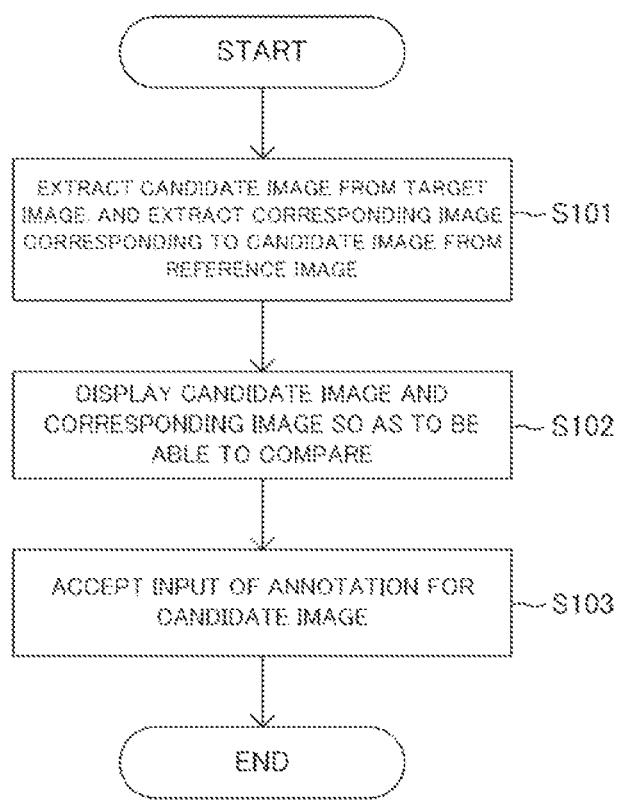
FIG. 11 is a flowchart showing an operation of the image processing apparatus in the second example embodiment.

Next, a second example embodiment of the present invention will be described with reference to FIGS. 9 to 11. FIGS. 9 to 10 are block diagrams showing a configuration of an image processing apparatus in the second example embodiment, and FIG. 11 is a flowchart showing an operation of the image processing apparatus. In this example embodiment, the overview of the configurations of the image processing apparatus and the image processing method described in the above example embodiment are shown.

First, with reference to FIG. 9, a hardware configuration of an image processing apparatus 100 in this example embodiment will be described. The image processing apparatus 100 is configured by a general-purpose information processing apparatus and, as an example, has the following hardware configuration including;

a CPU (Central Processing Unit) 101 (arithmetic logic unit), a ROM (Read Only Memory) 102 (storage unit), a RAM (Random Access Memory) 103 (storage unit), programs 104 loaded to the RAM 103, a storage device 105 for storing the programs 104, a drive device 106 that reads from and writes into a storage medium 110 outside the information processing apparatus, a communication interface 107 connected to a communication network 111 outside the information processing apparatus, an input/output interface 108 that inputs and outputs data, and a bus 109 connecting the respective components.

Then, the image processing apparatus 100 can structure and include an extracting unit 121, a displaying unit 122, and an input accepting unit 123 shown in FIG. 10 by acquisition and execution of the programs 104 by the CPU 101. For example, the programs 104 are stored in the storage device 105 and the ROM 102 in advance, and loaded to the RAM 103 and executed by the CPU 101 as necessary. The programs 104 may be supplied to the CPU 101 via the communication network 111, or may be stored in the storage medium 110 in advance and retrieved by the drive device 106 and supplied to the CPU 101. The extracting unit 121, the displaying unit 122, and the input accepting unit 123 may be structured by a dedicated electric circuit for realizing the units.

FIG. 9 shows an example of the hardware configuration of an information processing apparatus serving as the image processing apparatus 100, and the hardware configuration of the information processing apparatus is not limited to the above case. For example, the information processing apparatus may be configured by part of the above configuration, for example, excluding the drive device 106.

Then, the image processing apparatus 100 executes an image processing method shown in the flowchart of FIG. 11 by the functions of the extracting unit 121, the displaying unit 122 and the input accepting unit 123 structured by the programs as described above.

As shown in FIG. 11, the image processing apparatus 100 executes processes to:

extract a candidate image, which is an image of a candidate region specified in accordance with a preset criterion, from a target image to be a target for an annotation process, and also extract a corresponding image, which is an image of a corresponding region corresponding to the candidate region, from a reference image that is an image corresponding to the target image (step S101);

display the candidate image and the corresponding image so as to be able to compare the images with each other (step S102); and accept input of input information for the annotation process for the candidate image.

With the above configurations of the present invention, a candidate image that is part of a target image to be subject to an annotation process and a corresponding image that is part of a reference image corresponding to the target image and corresponds to the candidate image are displayed so that the images can be compared with each other. Consequently, an operator who performs the annotation process can easily and accurately recognize an object on the candidate image. As a result, the operator can easily and accurately perform the annotation process on the object on the candidate image.

The abovementioned programs can be stored by using various types of non-transitory computer-readable mediums and supplied to a computer. The non-transitory computer-readable mediums include various types of tangible storage mediums. Examples of the non-transitory computer-readable mediums are a magnetic recording medium (for example, a flexible disk, a magnetic tape, a hard disk drive), a magnetooptical recording medium (for example, a magnetooptical disk), a CD-ROM (Read Only Memory), a CD-R, a CD-R/W, and a semiconductor memory (for example, a mask ROM, a PROM (Programmable ROM), an EPROM (Erasable PROM), a flash ROM, a RAM (Random Access Memory)). Moreover, the programs may be supplied to a computer by various types of transitory computer-readable mediums. Examples of the transitory computer-readable mediums include an electric signal, an optical signal, and an electromagnetic wave. The transitory computer-readable mediums can supply the programs to a computer via a wired communication path such as an electric wire and an optical fiber or via a wireless communication path.

Although the present invention has been described above with reference to the example embodiments and others, the present invention is not limited to the above example embodiments. The configurations and details of the present invention can be changed in various manners that can be understood by one skilled in the art within the scope of the present invention. Moreover, at least one or more of the functions of the extracting unit, the displaying unit, and the input accepting unit described above may be executed by an information processing apparatus installed and connected in any place on the network, that is, may be executed by so-called cloud computing.

<Supplementary Notes>

The whole or part of the example embodiments disclosed above can be described as the following supplementary notes. Below, the overview of configurations of an image processing method, an image processing apparatus and a program according to the present invention will be described. However, the present invention is not limited to the following configurations.

(Supplementary Note 1)

An image processing method comprising:

extracting a candidate image, which is an image of a candidate region specified in accordance with a preset criterion, from a target image to be a target for an annotation process, and also extracting a corresponding image, which is an image of a corresponding region corresponding to the candidate region, from a reference image that is an image corresponding to the target image;

displaying the candidate image and the corresponding image so as to be able to compare the images with each other; and accepting input of input information for the annotation process for the candidate image.

(Supplementary Note 2)

The image processing method according to Supplementary Note 1, comprising enlarging the candidate image and the corresponding image and displaying so as to be able to compare the images with each other.

(Supplementary Note 3)

The image processing method according to Supplementary Note 1 or 2, comprising extracting the corresponding image from the reference image that is an image of a substantially same region as the target image.

(Supplementary Note 4)

The image processing method according to any of Supplementary Notes 1 to 3, comprising extracting the corresponding image from the reference image taken at different time from time when the target image has been taken.

(Supplementary Note 5)

The image processing method according to any of Supplementary Notes 1 to 4, comprising simultaneously displaying the candidate image and the corresponding image.

(Supplementary Note 6)

The image processing method according to any of Supplementary Notes 1 to 5, comprising:

extracting corresponding images from a plurality of reference images corresponding to one candidate image, respectively; and displaying the corresponding images so as to be able to compare the images with the one candidate image.

(Supplementary Note 7)

The image processing method according to any of Supplementary Notes 1 to 6, comprising:

extracting a plurality of candidate images from the target image, and also extracting corresponding images corresponding to the respective candidate images from the reference image; and sequentially displaying the candidate images and the corresponding images so as to be able to compare the mutually corresponding candidate image and corresponding image with each other.

(Supplementary Note 8)

The image processing method according to Supplementary Note 7, comprising setting a region that may include an object to be annotated based on a preset criterion in the target image, and extracting a plurality of candidate images based on the set region.

(Supplementary Note 9)

The image processing method according to any of Supplementary Notes 1 to 8, comprising displaying the input information input for the candidate image on the candidate image, and also displaying, on the corresponding image, corresponding input information corresponding to the input information displayed on the candidate image.
(Supplementary Note 10)
The image processing method according to any of Supplementary Notes 1 to 9, comprising
accepting, as the input information, input of information that identifies an object existing on the candidate image.
(Supplementary Note 11)
An image processing apparatus comprising:
an extracting unit configured to extract a candidate image, which is an image of a candidate region specified in accordance with a preset criterion, from a target image to be a target for an annotation process, and also extract a corresponding image, which is an image of a corresponding region corresponding to the candidate region, from a reference image that is an image corresponding to the target image;
a displaying unit configured to display the candidate image and the corresponding image so as to be able to compare the images with each other; and
an input accepting unit configured to accept input of input information for the annotation process for the candidate image.
(Supplementary Note 12)
The image processing apparatus according to Supplementary Note 11, wherein
the displaying unit is configured to enlarge the candidate image and the corresponding image and display so as to be able to compare the images with each other.
(Supplementary Note 13)
The image processing apparatus according to Supplementary Note 11 or 12, wherein
the extracting unit is configured to extract the corresponding image from the reference image that is an image of a substantially same region as the target image.
(Supplementary Note 14)
The image processing apparatus according to any of Supplementary Notes 11 to 13, wherein
the extracting unit is configured to extract the corresponding image from the reference image taken at different time from time when the target image has been taken.
(Supplementary Note 15)
The image processing apparatus according to any of Supplementary Notes 11 to 14, wherein
the displaying unit is configured to simultaneously display the candidate image and the corresponding image.
(Supplementary Note 16)
The image processing apparatus according to any of Supplementary Notes 11 to 15, wherein:
the extracting unit is configured to extract corresponding images from a plurality of reference images corresponding to one candidate image, respectively; and
the displaying unit is configured to display the corresponding images so as to be able to compare the images with the one candidate image.
(Supplementary Note 17)
The image processing apparatus according to any of Supplementary Notes 11 to 16, wherein:
the extracting unit is configured to extract a plurality of candidate images from the target image, and also extract corresponding images corresponding to the respective candidate images from the reference image; and
the displaying unit is configured to sequentially display the candidate images and the corresponding images so as to be able to compare the mutually corresponding candidate image and corresponding image with each other.
(Supplementary Note 18)
The image processing apparatus according to Supplementary Note 17, wherein
the extracting unit is configured to set a region that may include an object to be annotated based on a preset criterion in the target image, and extract a plurality of candidate images based on the set region.
(Supplementary Note 19)
The image processing apparatus according to any of Supplementary Notes 11 to 18, wherein
the input accepting unit is configured to display the input information input for the candidate image on the candidate image, and also display, on the corresponding image, corresponding input information corresponding to the input information displayed on the candidate image.
(Supplementary Note 20)
The image processing apparatus according to any of Supplementary Notes 11 to 19, wherein
the input accepting unit is configured to accept, as the input information, input of information that identifies an object existing on the candidate image.
(Supplementary Note 21)
A non-transitory computer-readable storage medium having a program stored therein, the program comprising instructions for causing an information processing apparatus to realize:
an extracting unit configured to extract a candidate image, which is an image of a candidate region specified in accordance with a preset criterion, from a target image to be a target for an annotation process, and also extract a corresponding image, which is an image of a corresponding region corresponding to the candidate region, from a reference image that is an image corresponding to the target image;
a displaying unit configured to display the candidate image and the corresponding image so as to be able to compare the images with each other; and
an input accepting unit configured to accept input of input information for the annotation process for the candidate image.

DESCRIPTION OF NUMERALS 1 input device
2 display device
10 image processing apparatus
11 region setting unit
12 region extracting unit
13 image display unit
14 annotation processing unit
15 target image storing unit
16 reference image storing unit
17 region information storing unit
18 annotation image storing unit
100 image processing apparatus
101 CPU
102 ROM
103 RAM
104 programs
105 storage device
106 drive device
107 communication interface
108 input/output interface
109 bus
110 storage medium
111 communication network
121 extracting unit 122 displaying unit
123 input accepting unit

What is claimed is:

1. An image processing method comprising:
extracting a candidate image, which is an image of a candidate region specified in accordance with a preset criterion, from a target image to be a target for an annotation process, and also extracting a corresponding image, which is an image of a corresponding region corresponding to the candidate region, from an unannotated reference image that is an image corresponding to the target image and is different from the target image;
displaying the candidate image, extracted from the target image, together with the corresponding image, extracted from the unannotated reference image, so as to be able to compare the images with each other; and
accepting input of input information for the annotation process for the candidate image.

2. An image processing apparatus comprising:
at least one memory configured to store instructions; and
at least one processor configured to execute the instructions to:
extract a candidate image, which is an image of a candidate region specified in accordance with a preset criterion, from a target image to be a target for an annotation process, and also extract a corresponding image, which is an image of a corresponding region corresponding to the candidate region, from an unannotated reference image, that is an image corresponding to the target image and different from the target image;
display the candidate image extracted from the target image, together with the corresponding image extracted from the unannotated reference image, so as to be able to compare the images with each other; and
accept input of input information for the annotation process for the candidate image.

3. The image processing apparatus according to claim 2, wherein the at least one processor is configured to execute the instructions to
enlarge the candidate image and the corresponding image and display so as to be able to compare the images with each other.

4. The image processing apparatus according to claim 2, wherein the at least one processor is configured to execute the instructions to
extract the corresponding image from the reference image that is an image of a substantially same region as the target image.

5. The image processing apparatus according to claim 2, wherein the at least one processor is configured to execute the instructions to
extract the corresponding image from the reference image taken at different time from time when the target image has been taken.

6. The image processing apparatus according to claim 2, wherein the at least one processor is configured to execute the instructions to
simultaneously display the candidate image and the corresponding image.

7. The image processing apparatus according to claim 2, wherein the at least one processor is configured to execute the instructions to:
extract the candidate image which is an image of the candidate image from one target image, and extract corresponding images from a plurality of reference images corresponding to the candidate image, respectively, the plurality of reference images corresponding to the one target image; and
display the corresponding images so as to be able to compare the images with the one candidate image,
wherein the corresponding images comprise the corresponding image, and
wherein the plurality of reference images comprise the unannotated reference image.

8. The image processing apparatus according to claim 2, wherein the at least one processor is configured to execute the instructions to:
extract a plurality of candidate images from the target image, and also extract corresponding images corresponding to the respective candidate images from the reference image; and
sequentially display the candidate images and the corresponding images so as to be able to compare the mutually corresponding candidate image and corresponding image with each other.

9. The image processing apparatus according to claim 8, wherein the at least one processor is configured to execute the instructions to
set a region that may include an object to be annotated based on a preset criterion in the target image, and extract a plurality of candidate images based on the set region.

10. The image processing apparatus according to claim 2, wherein the at least one processor is configured to execute the instructions to
display the input information input for the candidate image on the candidate image, and also display, on the corresponding image, corresponding input information corresponding to the input information displayed on the candidate image.

11. The image processing apparatus according to claim 2, wherein the at least one processor is configured to execute the instructions to
accept, as the input information, input of information that identifies an object existing on the candidate image.

12. A non-transitory computer-readable storage medium having a program stored therein, the program comprising instructions for causing an information processing apparatus to execute processes to:
extract a candidate image, which is an image of a candidate region specified in accordance with a preset criterion, from a target image to be a target for an annotation process, and also extract a corresponding image, which is an image of a corresponding region corresponding to the candidate region, from an unannotated reference image that is an image corresponding to the target image and is different from the target image;
display the candidate image, extracted from the target image, together with the corresponding image, extracted from the unannotated reference image, so as to be able to compare the images with each other; and
accept input of input information for the annotation process for the candidate image.

13. The image processing apparatus according to claim 2, wherein displaying the candidate image together with the corresponding image comprises displaying both the candidate image and the corresponding image together in a same window and while at a same time.

* * * * *